(12) United States Patent
Wood

(10) Patent No.: US 9,391,471 B2
(45) Date of Patent: Jul. 12, 2016

(54) RE-CONFIGURABLE CODED INDUCTIVE CHARGING SYSTEM

(71) Applicant: LOCKHEED MARTIN CORPORATION, Bethesda, MD (US)

(72) Inventor: James R. Wood, Grapevine, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 238 days.

(21) Appl. No.: 14/097,618

(22) Filed: Dec. 5, 2013

(65) Prior Publication Data

US 2014/0152252 A1    Jun. 5, 2014

Related U.S. Application Data

(60) Provisional application No. 61/733,654, filed on Dec. 5, 2012.

(51) Int. Cl.
*H02J 7/00* (2006.01)
*H02J 7/02* (2016.01)
*H02J 5/00* (2016.01)
*H01F 38/14* (2006.01)

(52) U.S. Cl.
CPC .............. *H02J 7/025* (2013.01); *H02J 5/005* (2013.01); *H01F 38/14* (2013.01)

(58) Field of Classification Search
CPC .......... Y02E 60/12; H02J 7/025; H01F 38/14; Y02T 90/122; B60L 11/182
USPC ........................................................ 320/108
See application file for complete search history.

(56) References Cited

U.S. PATENT DOCUMENTS

| | | | |
|---|---|---|---|
| 5,072,209 A * | 12/1991 | Hori ........................ | A42B 3/042 340/432 |
| 7,839,247 B2 | 11/2010 | Fullerton et al. | |
| 7,864,010 B2 | 1/2011 | Fullerton et al. | |
| 8,098,122 B2 | 1/2012 | Fullerton et al. | |
| 8,314,671 B2 | 11/2012 | Fullerton et al. | |
| 8,373,526 B2 | 2/2013 | Fullerton et al. | |
| 2003/0030342 A1* | 2/2003 | Chen ........................ | A47J 36/26 310/102 R |
| 2009/0082835 A1* | 3/2009 | Jaax ........................ | H02J 7/025 607/61 |
| 2009/0250032 A1* | 10/2009 | Fullerton .................. | F02P 3/02 123/143 B |
| 2010/0264871 A1* | 10/2010 | Matouka .................. | H02J 7/025 320/108 |
| 2012/0153894 A1* | 6/2012 | Widmer ................ | H04B 5/0037 320/108 |
| 2013/0058023 A1* | 3/2013 | Supran .................. | G06F 1/1632 361/679.01 |
| 2013/0119773 A1* | 5/2013 | Davis ...................... | H02J 5/005 307/104 |

\* cited by examiner

*Primary Examiner* — Richard Isla Rodas
*Assistant Examiner* — Mohammed J Sharief
(74) *Attorney, Agent, or Firm* — Terry M. Sanks, Esq.; Beusse Wolter Sanks & Maire, PLLC

(57) ABSTRACT

A method comprising supplying current to charging elements, a charging element producing a configurable magnetic field polarity, magnetic field polarities produced by the charging elements according to a charging polarity code. The method determines a relative position between a receiving element and a charging element, receiving elements fixedly electrically connected according to the charging polarity code, responsive to determining, re-configuring a magnetic field polarity of one or more of the charging elements due to movement of the receiving elements relative to the charging elements, and inducing a charging current by the charging elements in the receiving elements to increase power transfer from the charging elements to the receiving elements.

20 Claims, 6 Drawing Sheets

| Length | Barker Codes | Reversed Barker Codes |
|---|---|---|
| 2 | +1 -1 and +1 +1 | -1 +1 and -1 -1 |
| 3 | +1 +1 -1 | -1 -1 +1 |
| 4 | +1 +1 -1 +1 and +1 +1 +1 -1 | -1 -1 +1 -1 and -1 -1 -1 +1 |
| 5 | +1 +1 +1 -1 +1 | -1 -1 -1 +1 -1 |
| 7 | +1 +1 +1 -1 -1 +1 -1 | -1 -1 -1 +1 +1 -1 +1 |
| 11 | +1 +1 +1 -1 -1 -1 +1 -1 -1 +1 -1 | -1 -1 -1 +1 +1 +1 -1 +1 +1 -1 +1 |
| 13 | +1 +1 +1 +1 +1 -1 -1 +1 +1 -1 +1 -1 +1 | -1 -1 -1 -1 -1 +1 +1 -1 +1 -1 +1 -1 |

RE-CONFIGURABLE CODED INDUCTIVE CHARGING SYSTEM

CROSS REFERENCE TO RELATED APPLICATIONS

The present application claims the benefit of U.S. Provisional Application No. 61/733,654 filed Dec. 5, 2012, and incorporated herein by reference in its entirety.

FIELD

Disclosed embodiments relate to inductive charging using magnetic coils.

BACKGROUND

Inductive charging (also referred to as "wireless charging") uses a magnetic field to transfer energy between two objects. Energy is transmitted from a charging station to a portable electrical device, for example, using inductive coupling. Within the portable device the magnetic field-induced electrical current can charge batteries or supply power to operate the portable device.

Inductive chargers typically comprise a charging induction coil for creating a time-changing magnetic field within the charging station. The portable device comprises a receiving induction coil magnetically coupled to the charging induction coil. The proximate charging and receiving induction coils cooperate to form an electrical transformer and thus the time-changing magnetic field produced by the charging induction coil generates a current in the receiving induction coil. Thus the magnetic field transfers energy from the charging coil to the receiving coil for powering the portable device or for charging a battery in the portable device. Each of the charging and receiving coils typically comprise a plurality of coils that are referred to herein as a coil array.

One disadvantage of inductive charging is the relatively low power transfer efficiency and increased resistive heating when compared to direct contact (wired) current charging. This efficiency problem is exacerbated when one or both of the charging coil array and the receiving coil array moves relative to the other. Despite its disadvantages, inductive charging may be required in certain applications where wired contact is not desired, such as for charging batteries in an electrical device that cannot be directly connected to the charging station or an electrical device that is portable or moveable relative to the charging station.

SUMMARY

The embodiments comprise a method for charging batteries in a helmet from charging elements in a vest or outer garment. A method comprises supplying current to charging elements, a charging element producing a configurable magnetic field polarity, magnetic field polarities produced by charging elements according to a charging polarity code. According to the method, a relative position between a receiving element and a charging element, the receiving elements fixedly electrically connected according to the charging polarity code, is determined. Responsive to determining, re-configuring a magnetic field polarity of one or more of the charging elements due to movement of the receiving elements relative to the charging elements and inducing a charging current by the charging elements in the receiving elements to increase power transfer from the charging elements to the receiving elements.

A system comprising a charging station further comprising charging elements, responsive to current supplied to each charging element, each charging element producing a magnetic field for coupling to receiving elements, magnetic fields produced by the charging elements according to a charging polarity code. A device of the system further comprises receiving elements fixedly electrically connected according to the charging polarity code. The charging polarity code identifies each charging element as having a configurable magnetic field polarity. One or more sensors at the charging station or at the device sense relative positions between a receiving element and a charging element. A processor at the charging station re-configures a magnetic field polarity of one or more of the charging elements due to movement of the receiving elements relative to the charging elements and the charging elements for inducing a charging current in the receiving elements to increase power transfer from the charging elements to the receiving elements.

DETAILED DESCRIPTION

Figure 1:
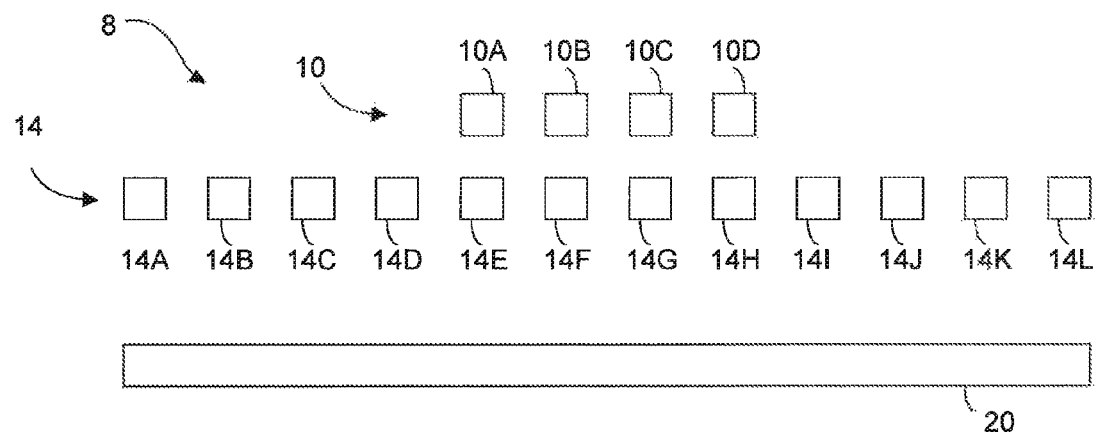
FIG. 1 is a block diagram of a charging system of the present embodiments.

Disclosed embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described herein with reference to example applications for illustration only. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

In one application of the embodiments, batteries present in a military helmet are charged from a charging station or charging array in a wearer's garment (e.g., a neck region or collar of a vest or outer garment). The charging station comprises one or more charging coils, collectively referred to as a charging array, disposed within an upper region of the wearer's garment and inductively coupled to transfer energy to one or more receiving coils, collectively referred to as a receiving array present in the wearer's head gear, for example, a helmet. The charging is accomplished by a wireless inductive charging technique from the charging station (in a first device for example) to the receiving array in a portable or movable device (a second device for example), such as the helmet. There is no direct wired connection between them.

For the military helmet application, if the receiving array in the helmet moves relative to the charging array in the outer garment, such as due to changes in position of the wearer's head via left or right rotation or translation along one or more axes, the corresponding charging and receiving coils are misaligned and therefore the inductive field coupling between these coils is reduced. Thus energy transfer from the charging array to the receiving array is reduced, that is, the efficiency of the charging action is also reduced.

Misalignment between coils/magnetic poles is sensed and compensated by reconfiguring the charging array to reduce the effect of the reduced inductive coupling.

The coils of the charging array are positioned and oriented such that the magnetic field created by each coil of the charging array is inductively coupled to a corresponding or aligned coil of the receiving array. The north/south magnetic field polarity (also referred to herein as a first and second magnetic field polarity) of each electromagnetic coil in the charging array generates a complementary south/north magnetic field polarity electromagnet in its corresponding receiving coil.

Each coil of the charging array bears a code symbol determined by the direction of current flow through that coil, which in turn determines the polarity orientation of the resulting magnetic field. The code symbols comprise a +1 or N (north pole) and −1 or S (south pole). A charging array code (i.e., a pattern of +1's and −1's) is selected to enhance the magnetic coupling between the charger array and the receiving array. The coils of the receiving array are connected (wired) according to the same code pattern.

As known in the art, an electromagnet comprises a coil of conductive wire usually wound around an iron core. The core may be shaped as a toroid or as an elongated member having a circular or rectangular cross-section, for example. When connected to a DC (direct current) voltage or current source the coil is energized, creating an electromagnet and its attendant magnetic field, which is analogous to the magnetic field created by a permanent magnet. A flux density of the magnetic field is proportional to the magnitude of the current flowing in the coil, as well as other physical and material properties of the coil and core. The polarity/orientation of the electromagnet (N or S) is determined by the direction of current flow. When a first coil is placed proximate a second coil and current is supplied to the first coil, a magnetic field of the first coil induces a current in the second coil. The induced current induces a magnetic field that is oriented in opposition to the field created by the first coil.

When connected to an AC (alternating current) voltage or current source the magnetic field of the first coil reverses polarity every half cycle. Thus the induced field also reverses polarity every half cycle.

As used herein, "one magnet" (e.g., one coil) is the arbitrary magnetic field strength associated with a single electromagnet as formed by the coil when energized.

The magnetic field polarities discussed and illustrated herein represent instantaneous polarity, i.e., a polarity of each coil at the same instant of time. However, it is known by those skilled in the art that at the next zero-crossing of the AC voltage waveform the magnetic field polarity switches, i.e., from north to south polarity or from south to north polarity.

With reference to FIG. 1, a charging system 8 comprises a receiving coil array 10 and a charging array 14. In one embodiment the receiving array 10 further comprises a plurality of receiving elements or receiving coils 10A-10D and the charging array 14 further comprises a plurality of charging coils or charging elements 14A-14L. The charging array 14 extends beyond the receiving array 10 to accommodate shifts of the receiving array relative to the charging array, either a left shift or a right shift, to maintain some degree of inductive coupling between the charging array and the receiving array.

When supplied with current, each charging element 14A-14L creates a magnetic field with a north (N) and a south (S) polarity. The magnetic field induces a current in each receiving coil 10A-10D. This current in turn produces a magnetic field emanating from the receiving coils 10A-10D of opposite polarity to the magnetic field that induced it. The coils of FIG. 1 may comprise any of the known coil types, shapes and materials. Generally, the charging elements 14A-14L generate a magnetic field with the same field intensity.

The embodiment of FIG. 1 depicts four coils in the receiving array 10 and twelve coils in the charging array 14. However, various embodiments and applications comprise more or fewer coils in each array.

It is desired that the charging array 14 comprise a greater number of coils than the receiving array 10 to accommodate left and right shifts of the receiving array 10. For example, in the helmet/collar embodiment the greater number of charging coils accommodates movement of the wearer's head. The charging code pattern of north and south poles, as described further below, repeats in the charging coils in any embodiment where the number of charging coils is greater than the number of receiving coils. For example, the charging system 8 of FIG. 1 may comprise a thirteen element receiving array and a 26 or 39 element charging array.

As the receiving array moves (i.e., translates and rotates) relative to the charging array, the conjugate relationship between the charging elements and the receiving elements of the two arrays may not be maintained and/or one or more coils of the receiving array may not be aligned with a coil of the charging array. This situation is detected, as described below, and the magnetic field from one or more coils of the charging array (or of the receiving array) is reoriented (from north to south or vice versa) to reestablish that conjugate relationship. Additionally, one or more coils of the charging array may be deselected and one or more coils of the charging array, which had previously not generated a magnetic field, may now be energized to generate a magnetic field.

The charging system 8 further comprises a back iron 20 spaced apart from the charging array 14. The back iron 20, connected across the back side or back plane of the charging array 14 confines the magnetic flux created by the charging array 14 in a direction toward the receiving coil array 10. Thus the field is maximized in a direction toward the receiving coil array and minimized in a direction away from the receiving coil array.

A material of the back iron 20 comprises a highly permeable or permeable material. The back iron 20 shorts magnetic field lines extending from the charging coils 14A-14L in a direction toward the back iron 20 and thereby prevents these field lines from interfering with the field lines from other ones of the charging array coils. Additionally, the back iron 20 prevents interference between field lines extending from the charging coils 14A-14L toward the back iron 20 and field lines extending away from the back iron 20.

In the various presented embodiments, a frequency of the AC signal supplied to the charging array (i.e., coil of the charging array) is generally in the tens of kilohertz, but could be in the range of about 1 kilohertz to about 100 kilohertz.

A polarity (north or south) of each charging coil (i.e., the polarity of the magnetic field as determined by the direction of the current supplied to each charging coil) is selected according to a charging polarity code having desirable spatial correlation properties. For example, according to one embodiment, the charging coils are coded according to a four bit Barker code. In another embodiment a gray code is implemented. The four charging coils generate four magnetic fields having magnetic field polarities of N N S N (or +1 +1 −1 +1 in the symbology of Barker codes).

Since the coils of the charging array 14 induce opposite polarity magnetic fields in the receiving array 10, the receiving array magnetic field polarities are opposite (also referred to as complements or conjugates) of the charging array magnetic field polarities.

It is desired to select a charging polarity code or code pattern (the Barker codes are examples of suitable codes) that have a high spatial correlation peak value when each coil of the charging array is aligned with a corresponding coil of the receiving array, (vertically aligned in the collar/helmet application described herein). Under this condition the coefficient of coupling between the corresponding coils is maximized and maximum energy is transferred from the charging array to the receiving array.

Under conditions of low spatial correlation the charging and receiving arrays are misaligned or do not bear the conjugate relationship, the coefficient of coupling is low and a minimal energy is transferred from the charging coils to the receiving coils.

When the receiving and charging arrays are referred to as aligned or in alignment, the difference between the code pattern of the charging array and the code pattern of the receiving array is zero, i.e., +1 and −1 bits in the charging array are aligned with respective −1 and +1 bits in the receiving array. This arrangement can be seen clearly in FIG. 2 as further described below.

Figure 2:
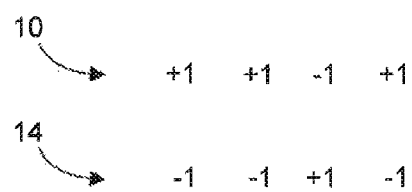
FIG. 2 illustrates a four bit Barker code for use with the charging and receiving arrays of FIG. 1.

FIG. 2 depicts a four bit Barker code implemented in the charging and receiving arrays, wherein a +1 designates a north pole and a −1 designates a south pole. The charging array coils generate an opposing magnetic field polarity in the receiving array coils. The charging and receiving arrays 14 and 10 are aligned in FIG. 2, thus correlation of the arrays is at its peak value.

Additionally the coils of the receiving array 10 are connected (i.e., hard wired) according to the implemented code, in the illustrated example according to a four bit Barker code. That is, the charging polarity code is implemented in the coils of the charging array and thereby induces current in certain of the receiving coils in a first direction and induces current in a second direction in other ones of the receiving coils. Thus to maximize the total current induced in the receiving array 10 the induced currents must be combined with regard to the direction of current flow. This feature is illustrated in FIG. 3.

Figure 3:
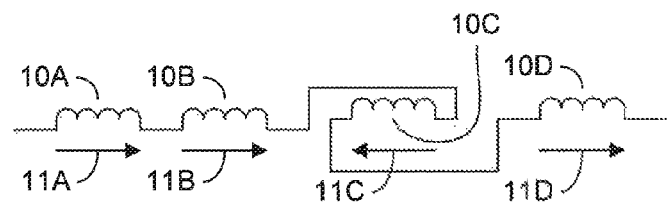
FIG. 3 is a schematic diagram of the coils of the receiving array.

FIG. 3 depicts a hard wired configuration of the receiving coils for implementing a four bit Barker code of +1 +1 −1 +1. The receiving coils 10A-10D and their respective current flow directions 11A-11D are shown. The coils 10A and 10B are wired in series since the current induced in each coil flows in the same direction. But the receiving coil 10C is wired in a reverse direction to account for the opposite direction of induced current 11C. The coil 10D is wired like the coils 10A and 10B since the current flow direction 11D is the same as the current flow directions 11A and 11B. Thus the selected code, in this embodiment a four bit Barker code, is hard wired into the receiving array 10 such that the currents induced in each coil are additive. Thus the receiving array can be characterized as implementing the selected four bit Barker code pattern Prior to any shifting of the receiving array 10 relative to the charging array 14, the polarity of the charging and the receiving coils are as indicated in FIG. 2. But when the receiving array 10 shifts left or right relative to the charging array 14, it may be necessary to reverse the direction of current flow in one or more of the charging coils to increase the current induced in the receiving array 10. It may also be desired to supply current to one or more of the charging coils 14A-14L (see FIG. 1) to maximize the total current induced in the receiving array. Finally, it may also be desired to stop supplying current to any charging coil that is not aligned with a receiving coil. Such charging coils are referred to as deselected charging coils. These operations reduce wasted energy and maximize energy transferred from the charging array to the receiving array, thereby improving the charging efficiency.

To determine a correlation value representing a correlation of the charging and receiving arrays 14 and 10, count the number of times the receiving coil has an opposite current direction or magnetic polarity relative to its corresponding charging coil. In FIG. 2 each of the four coil pairs (each pair comprising one charging coil and one receiving coil) has such an opposite current direction or magnetic field polarity and thus the correlation value is four. This is the largest possible correlation value (also referred to as the correlation peak) for a four bit Barker code.

Figures 4, 5:
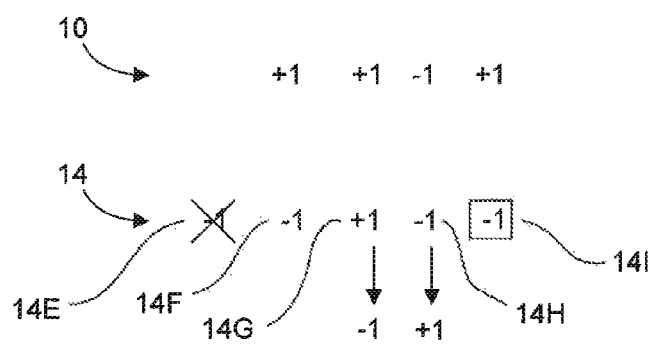
FIG. 4 depicts various Barker codes that can be used with the embodiments.
FIGS. 5-8 each illustrate a code pattern for the magnetic field of the charging coils and the conjugate code pattern induced in the receiving coils as the receiving array shifts relative to the charging array.

FIG. 4 depicts other Barker codes (and reverse Barker codes) that can be applied to the present embodiments in addition to the four bit Barker code of FIG. 2. A five bit Barker code has a correlation peak of five; a seven bit Barker code has a peak correlation value of seven; an eleven bit Barker code has a correlation peak of eleven and a thirteen bit Barker code has a peak correlation value of thirteen. As described further below, determining a correlation value can be used to determine whether the receiving and charging arrays are aligned. When the peak correlation value is obtained the arrays are aligned. When a lower correlation value is obtained the arrays are misaligned. Barker code interconnections are also disclosed in U.S. Pat. No. 7,864,010 to Fullerton et al.

Turing now to examples of receiving array shifts relative to the charging array, in FIG. 5 the receiving array 10 has shifted the distance of one coil to the right (because the wearer has turned his head left in the helmet/collar embodiment) relative to the charging array 14. This shift is detected as described below and responsive thereto the coil 14E is deselected since it is not inductively coupled to any of the receiving coils. The coil 14F remains unchanged. A polarity of the magnetic field generated by the coil 14G is reversed by reversing the direction of the current supplied to the coil 14G. Similarly the current supplied to the coil 14H is reversed. Finally the coil 14I, which was not previously energized since it was not inductively coupled to a receiving coil, is now supplied with current to generate a south or −1 polarity magnetic field.

With the charging array re-configured as illustrated in FIG. 5 and the receiving array hard-wired to generate maximum total current when the selected four bit Barker code is implemented in the charging array, maximum current is generated within the receiving array. With a maximum current in the receiving array the charging efficiency is maximized.

It can be seen that the polarity of the re-configured charging array 14 of FIG. 5 (comprising coils 14F-14I) matches the polarity of the charging array elements of FIG. 2, i.e., opposite to the polarity of the receiving array elements of FIGS. 5 and 2. The receiving array 10 is hard-wired (i.e., configured) to produce a maximum current when the charging array implements the illustrated four bit Barker code as depicted in FIGS. 2 and 5. Thus when the receiving array shifts and the charging array is re-configured to implement the selected four bit Barker code, maximum current is induced in the receiving array 14.

The condition of the charging coils 14A-14D and 14 J-14L is not indicted in FIG. 5 since they are not associated with the charging process, either before or after the receiving array has shifted.

Figure 6:
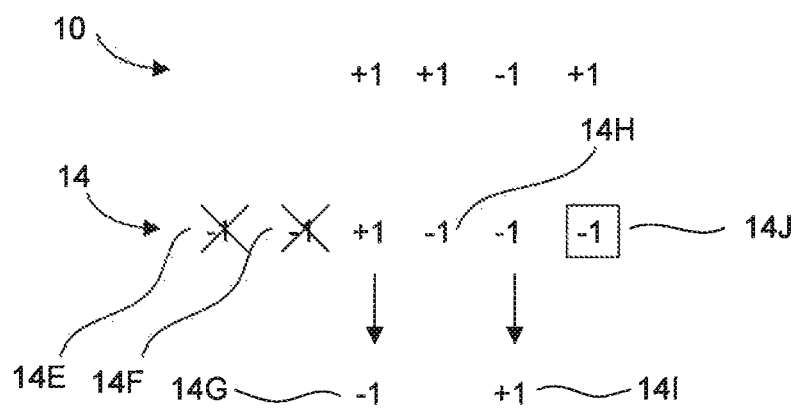

In FIG. 6 the receiving array 10 has shifted a distance of two coils to the right. The coils 14E and 14F have now been deselected. The current supplied to the coils 14G and 14I has been reversed in recognition of the hard wired condition of the receiving array 10. The coil 14H remains unchanged. The coil 14J is now energized to generate a south or −1 magnetic field. The receiving array 10 produces a maximum current with this reconfiguration of the charging array 14.

Figure 7:
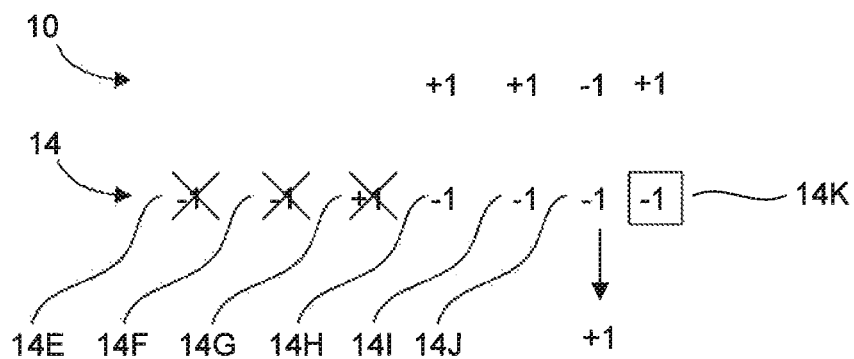

In FIG. 7 the receiving array 10 has shifted the distance of three coils to the right. The coils 14E, 14F and 14G have been deselected. The current supplied to the coil 14J is reversed. The coil 14K is energized to generate a south or −1 magnetic field. The receiving array 10 produces a maximum current with this reconfiguration of the charging array 14.

Figure 8:
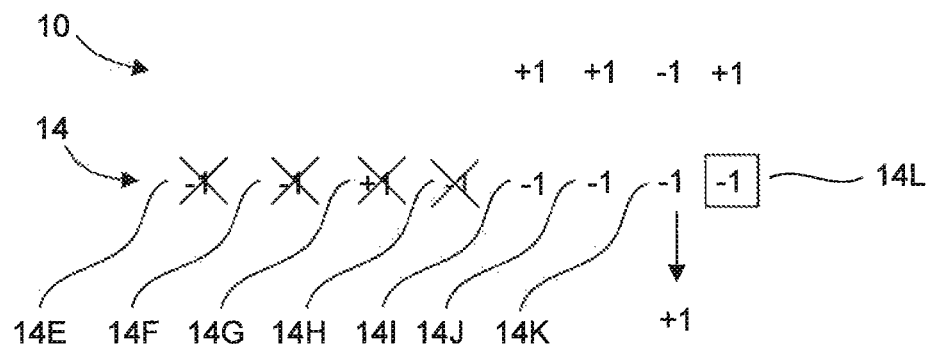

In FIG. 8 the receiving array 10 has shifted the distance of four coils to the right. The coils 14E-14H have been deselected. The current supplied to the coil 14K is reversed. The coil 14L is energized to generate a south or −1 magnetic field. The receiving array 10 produces a maximum current with this reconfiguration of the charging array 14.

Shifts of the receiving array relative to the charging array can be detected as described below. Such techniques are well known in the art.

Disclosed embodiments teach dynamic reconfiguration of the code pattern of the charging array 14 responsive to position information or misalignment that reflects shifts between a position of the receiving array 10 relative to the charging array 14. Changing the code pattern to compensate for relative motion between the receiving array and the charging array maximizes energy transferred from the latter to the former. Alignment information to provide position/motion data for the receiving array can be provided, in one embodiment, by a low power, low frequency tone generator and receiver utilizing the same charging and receiving arrays that provide the energy transfer.

In one embodiment low energy (or low power) and low frequency pilot tones are transmitted by the coils of the charging array for sensing by the coils of the receiving array to determine the relative alignment and position of the corresponding elements of the charging and receiving arrays.

Since the reactance presented by the coils is a direct function of frequency, use of relatively low frequency pilot tones is preferred. For example, a frequency in the range of about 400 Hz to about 2000 Hz is preferred. According to one embodiment, a technique and apparatus for sensing polarity orientation of the charging array elements and the receiving array elements, and thereby for determining whether all elements are properly aligned and bear a conjugate magnetic polarity relationship, transmits pilot tones from coils of the charging array. The pilot tones can be supplied from a commercially available oscillator such as Analog Device's Part Number AD598 LVDT signal conditioner integrated circuit (IC) available from Analog Devices, In. of Norwood, Mass. Results obtained from transmitting pilot tones (e.g., periodically, such as every second, or several seconds) may be used to determine whether to change the polarity of the charging array elements as described herein.

For a specific case where the magnetic field intensity of the charging array elements is on the order of 50 Oersted, a sensor such as the Honeywell HMC1501 or HMC1512 Magnetic Displacement Sensor (available from Honeywell International of Morris Plains, N.J.) on the receiving array can be used to determine the magnetic field intensity at each coil of the receiving array and thus determine the relative positions of the charging array elements relative to the receiving array elements.

Other position sensor arrangements may also be used including sensor arrangements not using the charging and receiving coils, but such arrangements will generally add to the parts count of the system, increasing the cost and reducing the reliability as compared to described pilot tone technique.

Although sensors for sensing a relative position between the receiving array elements and charging array elements are generally described as disposed at the charging array, such sensors may also be disposed at the receiving array, or at both the charging and the receiving arrays.

In an embodiment in which the sensors are disposed at the receiving array, the sensors sense the pilot tones and the receiving array transmits the relative position information to the charging array. The position information may comprise transmitting a second low frequency, low power signal to the charging array; the position information is coupled to the processor at the charging station for use in reversing current directions to one or more charging coils, for deselecting one or more charging coils or for energizing one or more charging coils that were not previously energized.

One embodiment comprises a threshold value associated with the reconfiguration of the charging coils. For example, if the alignment as determined by the sensors is below the threshold value then the polarity of the charging coils is not re-configured. But if the sensors determine that the misalignment is above this value, then the charging array is re-configured to ensure opposite polarity with the wired receiving array.

Figure 9:
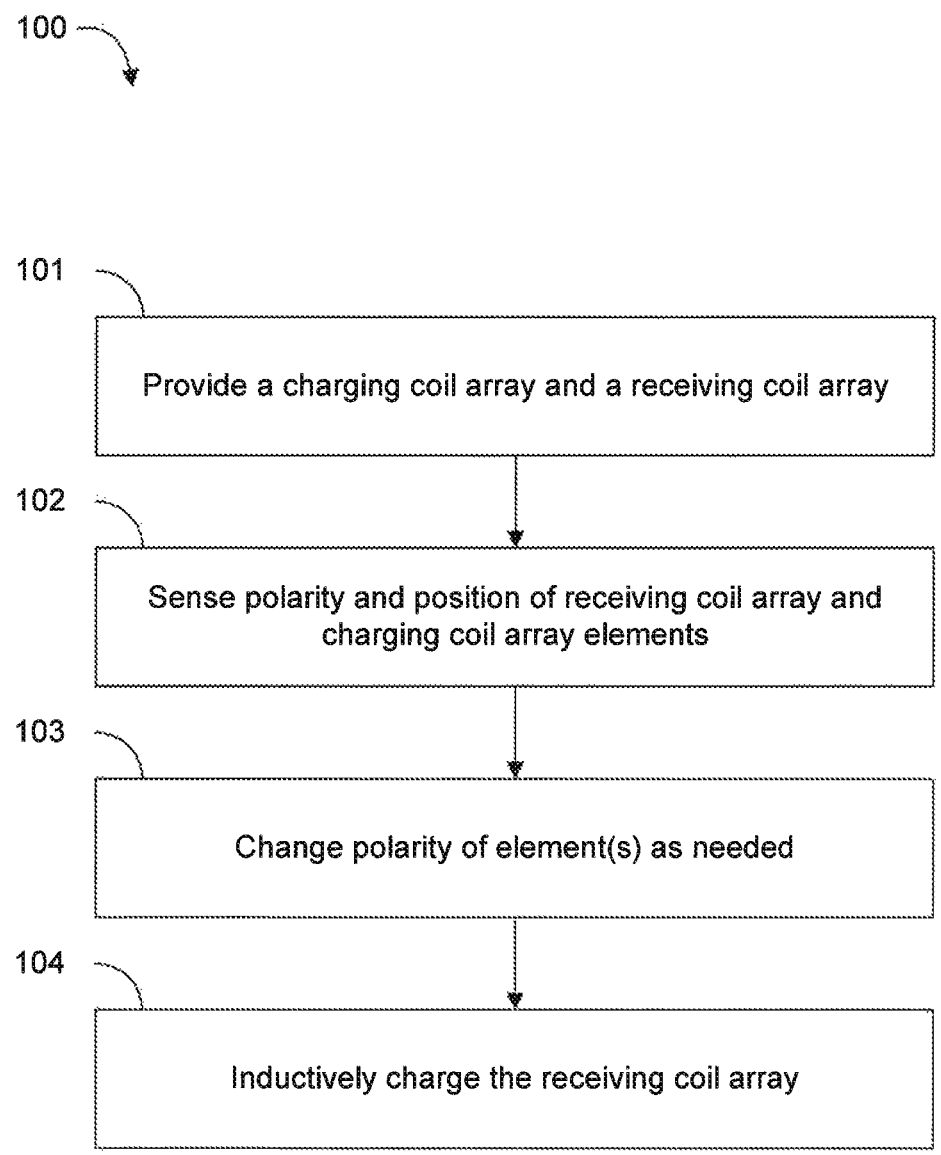
FIG. 9 is a flow chart illustrating steps of a method of wireless inductive charging using a coded coil array according to an embodiment.

FIG. 9 is a flow chart illustrating steps in a method 100 of wireless inductive charging using coded coil arrays according to one embodiment. At a step 101 the charging array and the receiving array are provided. As described herein, the charging array comprises a coded charging array having a plurality of electrically isolated charging coil elements or coils. The receiving array may be disposed in or on a portable device and further comprises a coded receiving coil array having a plurality of electrically isolated receiving coil elements or coils.

The polarity of each of the receiving and charging arrays represents a coding pattern of north (+1 or binary +1) and south (−1 or binary −1) code elements. Ideally, for maximum energy transfer, the charging array defines a complementary or conjugate coding pattern with respect to the code pattern implemented by the connections of the receiving array elements.

In one particular non-limiting example, for a thirteen element array the polarity pattern expressed as binary bits is: +1 +1 +1 +1 +1 −1 −1 +1 +1 −1 +1 −1 +1.

A step 102 comprises sensing a relative position between the coded receiving array and the coded charging array. Relative position as used herein is based on the alignment (or lack of alignment) of the coils of the charging array and the associated coils of the receiving array. Preferably for maximum power transfer the code pattern of the charging coil array is a conjugate of the code pattern of the receiving coil array, since the receiving array elements are physically connected according to the selected code pattern as implemented in the charging array. The physical connections are made in the receiving array so that when the charging array is a conjugate of the receiving array, maximum current is generated from the elements of the receiving array.

At a step 103, based on the relative position provided at the step 102, a polarity orientation of one or more of the charging array elements may be changed, deselected or energized, as described elsewhere herein, to improve the N-to-S or complementary orientation between the plurality of charging coil elements and the plurality of receiving coil elements. As used herein, changing a polarity of an element includes both changing a polarity orientation of the element and turning off or deselecting the element.

A step 104 comprises inductively charging the receiving array using at least a portion of the charging array. Generally, only those coil elements in the charging coil array that have been determined to be aligned with a corresponding element of the receiving array will be energized, while other charging array elements may be turned off or de-selected. Thus energy that would have been provided to the deselected coil elements is now added to the active charging coil elements.

Figure 10:
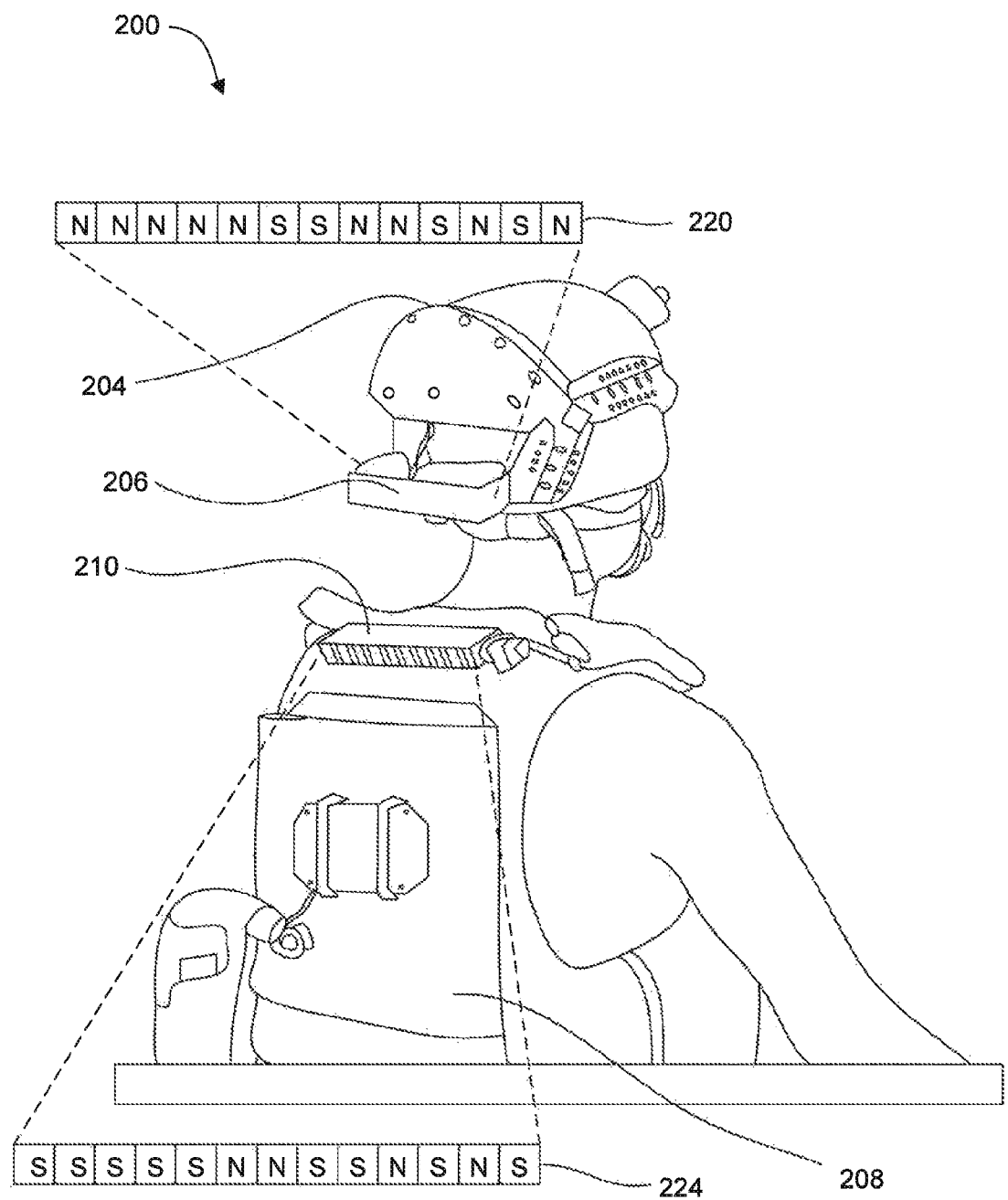
FIG. 10 illustrates one application for an embodiment comprising a helmet and vest.

FIG. 10 illustrates a charging system 200 further comprising a helmet 204 and its receiving coil array 206 and an outer garment or vest 208 and its charging coil array 210. The outer garment or vest worn about a wearer's chest. As illustrated, the charging coil array 210 may be positioned within or proximate a vest collar region. The polarity of each element of the receiving coil array 206 is illustrated by a code pattern 220 and the polarity of each element of the charging coil array 210 is illustrated by a code pattern 224. As described above, the code pattern 220 is implemented by the hard wired configuration of the receiving coil array elements. The code pattern 224 is implemented by the direction of current flow that is supplied to each element of the charging coil array.

The receiving coil array 206 is depicted as a linear coil array, but this configuration is not required. The charging coil array is also depicted as a linear coil array but again this is not required. Other embodiments comprise a slightly-curved charging and/or receiving array and two-dimensional arrays of various shapes and sizes.

In the illustrated embodiment of FIG. 10 each of the arrays 206 (receiving) and 210 (charging) comprises thirteen coil elements having a north or a south polarity orientation as indicated by the respective code pattern 220 and 224. In other embodiments, for example, the charging coil array 210 may comprise five or seven elements, such as by using Barker coding as described herein. In any case, the charging coil array 210 should have at least as many elements as the receiving coil array 206, and generally more elements to accommodate motion of the receiving coil array 206, such as in an embodiment where the receiving coil array 206 is mounted on a helmet.

For example, if the receiving coil array 206 comprises thirteen elements as shown, the charging coil array 210 generally includes more than thirteen elements to accommodate movement of the receiving coil array 206. In operation, any charging coil array elements that are not disposed below the thirteen elements of the receiving coil array are turned off or deselected as described herein.

There may be certain helmet positions, such as when the helmet wearer is looking directly up or down, where the charging efficiency is highest using fewer elements, say 11, 7, 5 or 4 elements. In this situation the coupling between the elements is reduced such that there is no advantage to increasing the energy to the charger by exciting additional coils.

Although not shown, the vest 208 may include a power supply generally in the form of a battery pack. In addition, although not shown, the vest 208 may also include a processor (e.g., microprocessor) and a stored coil pattern switching algorithm for controlling the polarity orientations of the charging coil array elements. The helmet 204 may also include a processor (e.g., microprocessor) and a stored coil pattern switching algorithm for controlling the polarity orientation of the receiving coil array elements.

Figure 11:
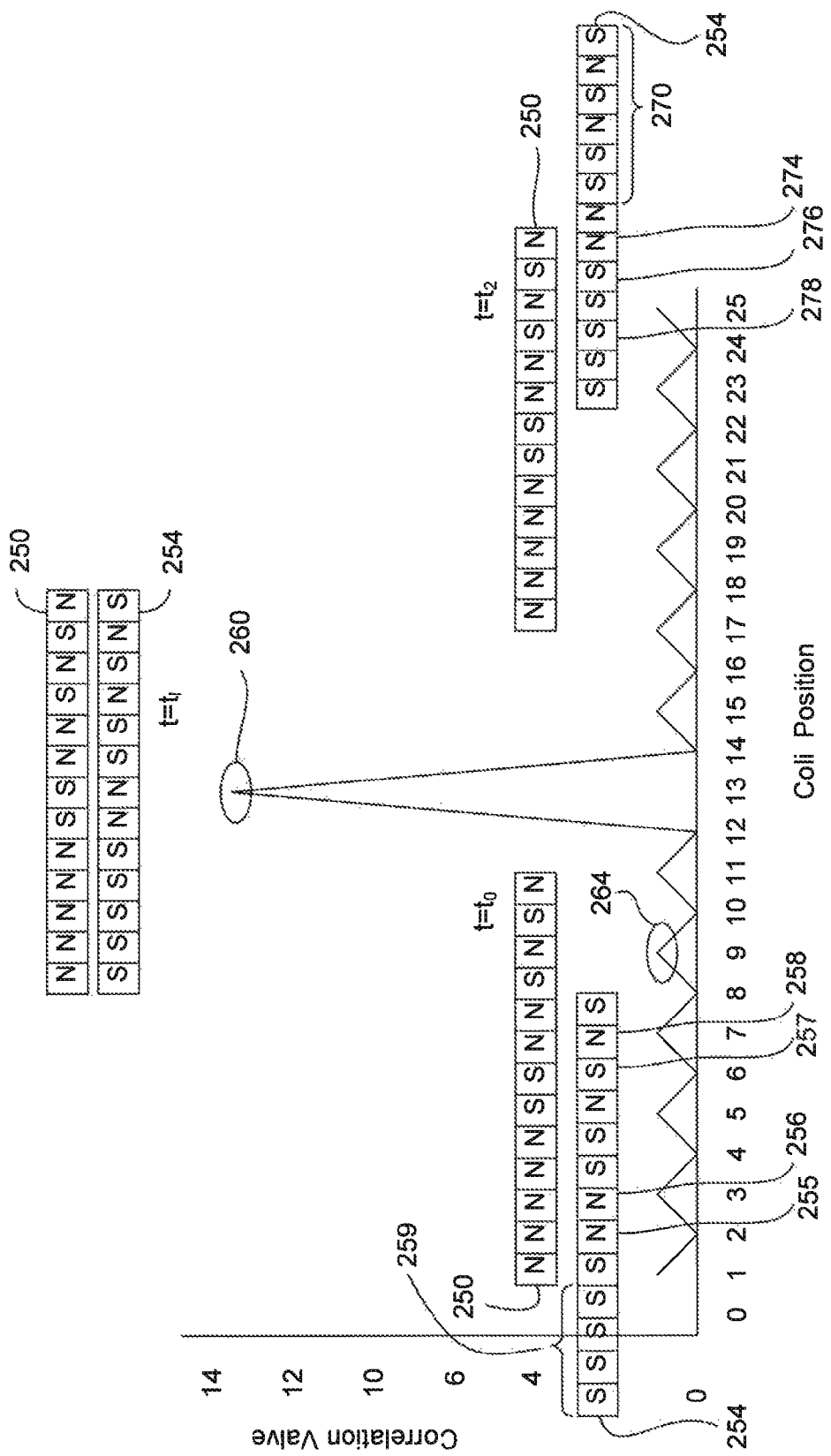
FIG. 11 depicts relative motion between the receiving array and the charging array of one embodiment and reconfigurations of the charging array to increase the charging efficiency.

A non-limiting example of FIG. 11 illustrates various conditions associated with a 13 element receiving array 250 and a charging array 254. As illustrated, in one embodiment the charging array 254 includes more elements than the receiving array 250. Some element misalignment is shown at a time $t=t_0$ due to shifting of the receiving array 250 to the right relative to the fixed-position charging array 254. Motion between the coded receiving array 250 (in the helmet for example) and coded charging array 254 (in the vest, for example) is sensed as described herein and current flow through the coding of elements 255, 256, 257 and 258 is reversed to account for (complement) the code pattern of the receiving array 250. The group of elements identified with reference numeral 259 is deselected. Prior to reversing and deselecting elements as described, the correlation between the receiving array 250 and the charging array 254 is below a peak correlation value 260, as indicated by a correlation value 264. After reversing and deselecting as described, nine of the thirteen elements are aligned and exhibit the proper polarity. Charging with this configuration is maximized for the aligned nine elements, but the energy transferred is less than when all of the thirteen elements are aligned.

At a time $t=t_1$ the charging and receiving arrays are aligned and each element has a complementary polarity relative to its corresponding element in the other array. Thus the correlation function exhibits a peak value of thirteen at $t=t_1$.

At time $t=t_2$ the receiving array has shifted to the left relative to the charging array. Elements 270 of the charging array 254 are deselected as they each lack an opposing element in the receiving array 250. The polarity of elements 274, 276 and 278 of the charging array 254 is reversed to present a complementary polarity relative to the opposite element in the receiving array 250. Since only six elements in the receiving and charging arrays 250 and 254 are correlated, the correlation function has a value below the peak value 260.

With continued reference to FIG. 11, when the code pattern of the charging coil array 254 is complementary with the code pattern of the receiving coil array 250, the attractive magnetic force generated between the arrays may be considered to be 13 units, with 1 unit of magnetic force transferred for each one of the 13 element pairs over the center of the selected code pattern. As shown, with alignment of 12 or fewer elements (i.e., some coil misalignment), due to field cancellation the magnetic force shown drops to only 1 unit of magnetic force.

In one embodiment the coils of the charging array are electrically/magnetically isolated from each other by use of an inner permeable core located within each coil. The core may encompass only a portion of the inner region of the coil. The back iron 20 illustrated in FIG. 1 also provides some isolation of the coils.

Disclosed coded arrays of electromagnets can provide significantly higher induction field coupling as compared to an equivalent length of linear, uncoded electromagnets. The higher field strength reaching the receiving array (i.e., in the portable device such as a helmet) provides more efficient power transfer. At extreme ranges of motion between the receiving array and the charging array, the reconfigurable coding can be improved for "short codes" (where short is generally considered less than or equal to about 13 code elements) that perform significantly better than a linear coil array as the alignment between the arrays is reduced. As described above, elements of the charging array that are not efficiently coupled (i.e., not aligned with) a corresponding element of the receiving array can be de-selected or turned off to preserve charging energy that would otherwise be wasted as heat in the underused/unused elements of the charging array.

Alternate embodiments include providing switching for the receiving coil array to vary the polarity pattern, where the charging array and the receiving array are both switched. Switching for the receiving array (in the helmet, for example) can be provided by including a processor (e.g., microprocessor) and a stored switching algorithm for operation with the receiving array.

Helmet equipment manufacturers and night vision vendors are examples of manufacturers who may benefit from the disclosed embodiments. Moreover, more generally, disclosed embodiments may comprise batteries and power supplies such as fuel cells and small generators that are powered directly. The teachings of the embodiments may be applied to data transmission and communications devices, such as by wireless propagation and night vision goggles.

As used herein, a reference to a charging coil or a receiving coil includes respectively an array of charging coils or an array of receiving coils.

Although the embodiments have been described with respect reconfiguring the charging array to implement the selected code, other embodiments teach reconfiguring the receiving array either in lieu of or as a supplement to reconfiguration of the charging array.

While various disclosed embodiments have been described above, it should be understood that they have been presented by way of example only, and not as a limitation. Numerous changes to the disclosed embodiments can be made in accordance with the disclosure herein without departing from the spirit or scope of this disclosure. Thus, the breadth and scope of this disclosure should not be limited by any of the above-described embodiments. Rather, the scope of this disclosure should be defined in accordance with the following claims and their equivalents.

Although described relative to a particular embodiment of a helmet charging system, the disclosed embodiments may generally be applied to wireless inductive charging between a charging array or charging station (comprising a coded charging coil array) and a device (comprising a coded receiving coil array) moveable and not electrically connected to the charging station.

Although disclosed embodiments have been illustrated and described with respect to one or more implementations, equivalent alterations and modifications will occur to others skilled in the art upon the reading and understanding this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art pertinent to this disclosure. It will be further understood that terms, such as those defined in commonly-used dictionaries, should be interpreted as having a meaning that is consistent with their meaning in the context of the relevant art and will not be interpreted in an idealized or overly-formal sense unless expressly so defined herein.

One embodiment comprises a threshold value associated with the reconfiguration of the charging coils. For example, if the alignment as determined by the sensors is below the threshold value then the polarity of the charging coils is not re-configured. But if the sensors determine that the misalignment is above this value, then the charging array is re-configured to ensure opposite polarity with the wired receiving array.

What is claimed is:

1. A system comprising:
a charging station disposed in an upper region of a garment worn about a wearer's chest, the charging station further comprising hack iron and charging elements, responsive to current supplied to a charging element, the charging element to produce a magnetic field for coupling to a receiving element in a helmet worn by the wearer, magnetic fields produced by the charging elements according to a charging polarity code;
a battery disposed in the helmet for charging by the charging station;
a plurality of receiving elements fixedly electrically connected according to the charging polarity code in the helmet, the charging elements greater in number than the plurality of receiving elements;
the back iron spaced apart from the charging elements and connected across a back plane of the charging elements, the hack iron to confine magnetic flux created by the charging elements in a direction toward the plurality of receiving elements;
one or more sensors at the charging station or at the helmet for sensing relative positions between a receiving element and a charging element as a head of the wearer moves relative to the garment;
a processor at the charging station for re-configuring a magnetic field polarity of one or more of the charging elements due to movement of the receiving elements relative to the charging elements as determined by the one or more sensors; and
those charging elements aligned with the plurality of receiving elements for to inductively induce a charging current in the plurality receiving elements to increase power transfer from the charging elements to the plurality of receiving elements.

2. A method comprising:
a) providing a movable device comprising receiving elements fixedly electrically connected according to a polarity code having a code pattern;
b) providing a wearable device comprising charging elements greater in number than the receiving elements and a processor, a respective charging element producing a configurable magnetic field polarity to inductively transfer energy to a respective receiving element according to a conjugate relationship;
c) determining relative positions between the receiving elements and the charging elements;
d) re-configuring, by the processor, magnetic field polarity of one or more charging elements based on the determined relative positions of the receiving elements in relation to the charging elements to form a conjugate pattern of the code pattern for the polarity code with those Charging elements currently aligned with the receiving elements and remaining charging elements turned off to preserve charging energy;
e) inductively transferring energy to the receiving elements of the movable device with said those charging elements currently aligned with the receiving elements to provide power to the movable device; and
f) repeating c), d) and e) as the movable device moves relative to the wearable device.

3. The method of claim 2, wherein re-configuring comprises at least one of supplying current to a charging element, reversing a direction of current supplied to a charging element, and deselecting a charging element.

4. The method of claim 2, wherein the receiving elements fixedly electrically connected according to the polarity code comprises the receiving elements wired according to the charging polarity code.

5. The method of claim 2, wherein maximum energy transfer occurs to the receiving elements by the charging elements according to the polarity code.

6. The method of claim 2, wherein comprises transmitting pilot tones from one or more of the charging elements and sensing a received pilot tone at one or more of the receiving elements.

7. The method of claim 2, wherein the wearable device comprises a vest, and the method further comprising disposing the charging elements at an upper region of the vest when the vest is worn.

8. The method of claim 7, wherein the movable device comprises a helmet comprising batteries, the method further comprising charging the batteries by the charging elements through the receiving elements.

9. The method of claim 7, wherein the polarity code comprises a Barker code or a gray code.

10. The method of claim 2, wherein the receiving elements and the charging elements comprise coils with magnetic poles and the determining comprises:
sensing misalignment between the magnetic poles of the receiving elements and the charging elements.

11. The method of claim 10, wherein a magnetic pole of each charging element of said those charging elements currently aligned with the receiving elements is selected according to spatial correlation properties of the polarity code.

12. The system of claim 10, wherein the wearable device comprises back iron spaced apart from the charging elements and connected across a back plane of the charging elements, the back iron to confine magnetic flux created by the charging elements in a direction toward the receiving elements.

13. The method of claim 2, wherein the wearable device comprises back iron spaced apart from the charging elements and connected across a back plane of the charging elements; and
further comprising confining magnetic flux created by the charging elements in a direction toward the receiving elements.

14. A system comprising:
a movable device comprising receiving elements fixedly electrically connected according to a polarity code having a code pattern;
a wearable device comprising a charging station with charging elements greater in number than the receiving elements and a processor, each charging element to produce a configurable magnetic field polarity to inductively transfer energy to a receiving element according to a conjugate relationship; and
sensors to determine relative positions between the receiving elements and the charging elements;
wherein the processor to re-configure magnetic field polarity of one or more charging elements based on the determined relative positions of the receiving elements in relation to the charging elements to form a conjugate pattern of the code pattern for the polarity code with those charging elements currently aligned with the receiving elements and remaining charging elements turned off to preserve charging energy; and
said those charging elements currently aligned with the receiving elements inductively transfer energy to the receiving elements.

15. The system of claim 14, wherein the sensors are disposed at the charging station.

16. The system of claim 14, wherein the sensors are disposed at the movable device and the movable device transmits a signal indicating the relative positions to the charging station.

17. The system of claim 14, wherein the receiving elements fixedly electrically connected according to the polarity code comprises the receiving elements wired together such that induced current flow from the receiving elements is additive.

18. The system of claim 14, wherein the movable device comprises a helmet comprising batteries charged by the charging elements through the receiving elements; and the wearable device comprises a vest with the charging elements disposed at a collar region of the vest.

19. The system of claim 14, wherein the receiving elements and the charging elements comprise coils with magnetic poles and the sensors to sense misalignment between the magnetic poles of the receiving elements and the charging elements.

20. The system of claim 19, wherein a magnetic pole of each charging element of said those charging elements currently aligned with the receiving elements is selected according to spatial correlation properties of the polarity code.

* * * * *